US010936244B1

(12) United States Patent
Danilov et al.

(10) Patent No.: US 10,936,244 B1
(45) Date of Patent: Mar. 2, 2021

(54) BULK SCALING OUT OF A GEOGRAPHICALLY DIVERSE STORAGE SYSTEM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 7 days.

(21) Appl. No.: 16/570,690

(22) Filed: Sep. 13, 2019

(51) Int. Cl.
*G06F 3/06* (2006.01)

(52) U.S. Cl.
CPC ............ *G06F 3/0655* (2013.01); *G06F 3/064* (2013.01); *G06F 3/065* (2013.01); *G06F 3/067* (2013.01); *G06F 3/0608* (2013.01); *G06F 3/0611* (2013.01); *G06F 3/0623* (2013.01)

(58) Field of Classification Search
None
See application file for complete search history.

(56) References Cited

U.S. PATENT DOCUMENTS

2001/0044879 A1* 11/2001 Moulton ................. H04L 69/40 711/114
2020/0142976 A1* 5/2020 Danilov .............. G06F 16/1844

* cited by examiner

*Primary Examiner* — Kevin Verbrugge
(74) *Attorney, Agent, or Firm* — Amin, Turocy & Watson, LLP

(57) ABSTRACT

Bulk scaling out of a geographically diverse storage system is disclosed. Bulk scaling out can result in addition of at least two zone storage components to the geographically diverse storage system. Bulk scaling out can provide an avenue to move and compact data to benefit the geographically diverse storage system. Benefits can include faster access to data, faster recovery time for data that becomes less accessible, reduced computing resource demands, etc. Chunks can be moved for greater diversity in a bulk scaled out system. The greater diversity can allow for compaction of data protection chunks, which can result in consuming less storage space to protect more diversified data storage. In some embodiments data from existing zone storage components can be moved to added zone storage components. In some embodiments, protection data from existing zone storage components can be moved to added zone storage components in a more compacted condition.

20 Claims, 10 Drawing Sheets

100

FIRST ZONE STORAGE COMPONENT (ZSC) 110
D1
D3

SECOND ZONE STORAGE COMPONENT (ZSC) 120
D2
D4

FOURTH ZONE STORAGE COMPONENT (ZSC) 140

COMMUNICATION FRAMEWORK 102

FIFTH ZONE STORAGE COMPONENT (ZSC) 150

SCALING COMPONENT 190

THIRD ZONE STORAGE COMPONENT (ZSC) 130
D1D2
D3D4

BULK SCALING OUT OF A GEOGRAPHICALLY DIVERSE STORAGE SYSTEM

TECHNICAL FIELD

The disclosed subject matter relates to data convolution, more particularly, to addition of multiple storage zones to a geographically diverse storage zone system.

BACKGROUND

Conventional data storage techniques can employ convolution and deconvolution of data to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage.

DETAILED DESCRIPTION

Figure 1:
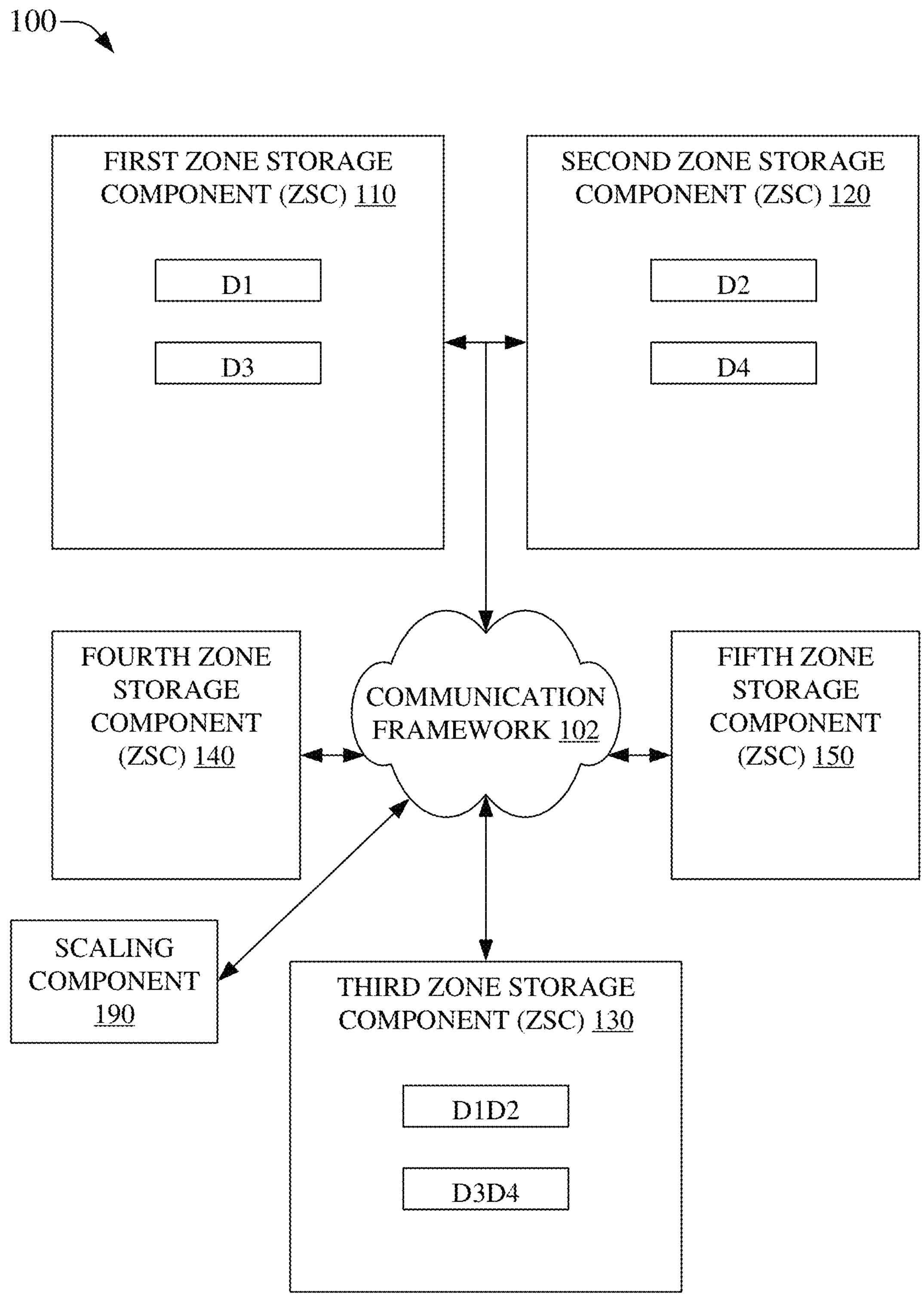
FIG. 1 is an illustration of an example system that can facilitate addition of multiple storage zones to a geographically diverse storage system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage. Examples of bulk data storage can include networked storage, e.g., cloud storage, for example ECS (formerly Elastic Cloud Storage) offered by Dell EMC. Bulk storage can, in an aspect, manage disk capacity via partitioning of disk space into blocks of fixed size, frequently referred to as chunks, for example a 128 MB chunk, etc. Chunks can be used to store user data, and the chunks can be shared among the same or different users, for example, one chunk may contain fragments of objects from several users. A chunk's content can generally be modified in an append-only mode to prevent overwriting of data already added to the chunk. As such, when a typical chunk becomes full enough, it can be sealed so that the data therein is generally not available for further modification. These chunks can be then stored in a geographically diverse manner to allow for recovery of the data, such as if a first copy of the data is destroyed, e.g., disaster recovery, etc. Blocks of data, hereinafter 'data chunks', or simply 'chunks', can be used to store user data. Chunks from a data storage device, e.g., 'zone storage component' (ZSC), 'zone storage device' (ZSD), etc., located in a first geographic location/area/region, hereinafter a 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

Geographically diverse data storage can use data compression to store data. As an example, a storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved, for example via an exclusive-or operation, hereinafter 'XOR', into a different chunk to allow recovery of the Seattle or San Jose data from the convolved chunk, but where the convolved chunk typically consumes less storage space than the sum of the storage space for both the Seattle and San Jose chunks individually. In an aspect, compression can comprise convolving data and decompression can comprise deconvolving data, hereinafter the terms compress, compression, convolve, convolving, etc., can be employed interchangeably unless explicitly or implicitly indicated otherwise, and similarly, decompress, decompression, deconvolve, deconvolving, etc., can be used interchangeably. Compression, therefore, can allow original data to be recovered from a compressed chunk that consumes less storage space than storage of corresponding uncompressed data chunks. This can be beneficial in that data from a location can be backed up by redundant data in another location via a compressed chunk, wherein a redundant data chunk can be smaller than the sum of the data chunks contributing to the compressed chunk. As such, data can be compressed via a convolution technique to reduce the amount of storage space used at a geographically distinct location.

A convolved chunk stored at a geographically diverse storage device, e.g., ZSC, ZSD, in a zone, etc., can comprise data from some or all storage devices of a geographically diverse storage system. As an example, where there are five storage devices corresponding to different storage zones of the geographically diverse storage system, a first zone can comprise unconvolved or convolved chunks from the other four storage devices to create a 'backup' of the data from the other four storage devices, albeit the convolved chunks can consume less storage space than the corresponding unconvolved chunks. In this example, the first storage device can, in an embodiment, create a backup chunk from chunks received from the other four storage devices. In an aspect, this can result in generating copies of the four received chunks at the first storage device and, in some embodiments, then convolving the four chunks to generate a fifth chunk that is a backup of the other four chunks. Moreover, one or more other copies of the four chunks and/or the fifth chunk can be created at the first storage device for redundancy. In another example, the first storage device can convolve chunks from three of the other four storage devices, etc.

In an embodiment of the disclosed subject matter, a first data chunk and a second data chunk corresponding to a first and second zone that are geographically diverse can be stored in a third data chunk stored at third zone that is geographically diverse from the first and second zones. In an aspect the third chunk can represent the data of the first and second data chunks in a compressed form, e.g., the data of the first data chunk and the second data chunk can be convolved, such as by an XOR function, into the third data chunk. In some embodiments, convolved chunks can be further convolved with other chunks and/or other convolved chunks to yield a further convolved chunk, e.g., chunk A can be convolved with chunk B to yield chunk AB, which can be convolved with chunk C to yield chunk ABC, which can be convolved with chunk DEF to yield chunk ABCDEF, etc. In an embodiment, first data of the first data chunk and second data of the second data chunk can be convolved with or without replicating the entire first data chunk and the entire second data chunk at data store(s) of the third zone, e.g., as at least a portion of the first data chunk and at least a portion of the second data chunk are received at the third zone, they can be convolved to form at least a portion of the third data chunk. In an aspect, where compression occurs without replicating a chunk at another zone prior to compression, this can be termed as 'on-arrival data compression' and can reduce the count of replicate data fragments, chunks, etc., made at the third zone, similarly data transfers events can correspondingly also be reduced. In an aspect, a ZSC can comprise one or more data storage components that can be communicatively coupled, e.g., a ZSC can comprise one data store, two or more communicatively coupled data stores, etc. In an aspect, this can allow replication of data in the ZSC and can provide data redundancy in the ZSC, for example, providing protection against loss of one or more data stores of a ZSC. As an example, a ZSC can comprise multiple hard drives and a chunk can be stored on more than one hard drive such that, if a hard drive fails, other hard drives of the ZSC can comprise the chunk, or a replicate of the data of the chunk in an uncompressed or compressed format.

In an aspect, as data in chunks becomes stale, old, redundant, etc., it can be desirable to delete these chunks to free storage space for other uses. In an aspect, a convolved chunk can be de-convolved, partially or completely, to yield other chunks, e.g., the other chunks can represent the same data as the convolved chunk, but the other chunks can typically consume more storage space that the convolved chunk because these other chunks are 'less highly convolved'. As an example, the chunk (AB(CD)), which can be chunk A convolved with Chunk B convolved with a chunk that itself is a convolution of chunks C and D, can be deconvolved into chunks A to D, into chunks A, B, and (CD), into chunks A and B(CD), etc. Moreover, in this example, because the convolution can be commutative, such as where an XOR function is used to convolve/deconvolve the data, the chunk (AB(CD)) can be deconvolved into, for example, chunks B and A(CD), chunks A, D, and (BC), etc. Where a chunk is to be deleted in a remote zone, the deconvolution can comprise transfer of other chunks to facilitate the deconvolution. As an example, where the chunk (AB(CD)) is at a first zone, and chunk D is to be deleted, data for one or more of chunks A, B, and C, can be replicated in the first zone from other zones to facilitate deconvolution, e.g., (AB(CD) XOR (ABC), where data for one or more of chunks A, B, and C, is replicated into the first zone, and can result in chunks (ABC) and D, such that chunk D can be deleted and leave just chunk (ABC) at the first zone. As such, it can be desirable to reduce the resource consumption in replicating chunks between zones to facilitate the deletion of a chunk from a convolved chunk. As an example, it can consume less bandwidth to replicate Chunk (ABC) from a second zone to the example first zone as compared to replicating each of Chunk A, Chunk B, and Chunk C from the second zone to the first zone. This can be accommodated, for example, by first, in the second zone, generating a compressed chunk (ABC), such as from chunks A, B, and C, from chunk AB and chunk C, from chunk AC and chunk B, etc., prior to replicating generated chunk ABC into the first zone.

In an aspect, compression/convolution of chunks can be performed by different compression/convolution technologies. Logical operations can be applied to chunk data to allow compressed data to be recoverable, e.g., by reversing the logical operations to revert to an earlier form of chunk data. As an example, data from chunk 1 can undergo an exclusive-or operation, hereinafter 'XOR', with data from chunk 2 to form chunk 3. This example can be reversed by XORing chunk 3 with chunk 2 to generate chunk 1, etc. While other logical and/or mathematical operations can be employed in compression of chunks, those particular operation details are generally beyond the scope of the presently disclosed subject matter and, for clarity and brevity, only the XOR operator will be illustrated herein, however, it is noted that the disclosure is not so limited to just XOR operations and that those other operations or combinations of operations can be substituted without departing from the scope of the present disclosure. As such, all logical and/or mathematical operations for compression germane to the disclosed subject matter are to be considered within the scope of the present disclosure even where not explicitly recited for the sake of clarity and brevity.

In an aspect, the presently disclosed subject matter can, as mentioned, include 'zones'. A zone can correspond to a geographic location or region. As such, different zones, e.g., where a zone can connote a group of ZSCs or ZSDs in a geographic area, etc., can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas local data chunks. The convolved Boston chunk can consume less disk space than the sum of the separate Seattle and Dallas local chunks. An example technique can be "exclusive or" convolution, hereinafter 'XOR', '⊕', etc., where the data in the Seattle and Dallas local chunks can be convolved by XOR processes to form the Boston chunk, e.g., C=A1⊕B1, where A1 is a replica of the Seattle local chunk, B1 is a replica of the Dallas local chunk, and C is the convolution of A1 and B1. Of further note, the disclosed subject matter can be employed in more or fewer zones, in zones that are the same or different than other zones, in zones that are more or less geographically diverse, etc. As an example, the disclosed subject matter can be applied to data of a single disk, a memory, a drive, a data storage device, etc., without departing from the scope of the disclosure, e.g., the zones can represent different logical areas of the single disk, memory, drive, data storage device, etc. Moreover, it will be noted that convolved chunks can be further convolved with other data, e.g., D=C1⊕E1, etc., where E1 is a replica of, for example, a Miami local chunk, E, C1 is a replica of the Boston partial chunk, C, e.g., a convolved chunk, from the previous example, such that D is an XOR of C1 and E1 and can be, for example, located in Fargo.

In an aspect, XORs of data chunks in disparate geographic locations can provide for de-convolution of the XOR data chunk to regenerate the input data chunk data. Continuing a previous example, the Fargo chunk, D, can be de-convolved into C1 and E1 based on either C1 or D1; the Miami chunk, C, can be de-convolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, de-convolution can rely on retransmitting a replica chunk that so that it can be employed in de-convoluting the convolved chunk. As an example, the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to de-convolve C. As an example, where the Seattle chunk, A, is corrupted, the data can be recovered from C by de-convolving C with a replica of the Dallas chunk B. As such, B can be replicated by copying B from Dallas to Boston as B1, then de-convolving C with B1 to recover A1, which can then be copied back to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to de-convolve C with after A has been deleted. As such, it can be desirable to de-convolve C into A1 and B1 prior to deleting A and A1, such that B1 can be convolved with another chunk, for example Miami chunk, E. As such, recovery of B1 can be based on E1 and the XOR of B1E1. Also, of note, to de-convolve C to recover B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be de-convolved.

In an aspect, a geographically diverse storage construct allows for addition or removal of zones, ZSCs, ZSDs, etc. As an example, a new zone can be added to a geographically diverse storage system. As another example, a zone can be split into two or more zones by adding other zone storage devices and redefining the extents of corresponding zones, such as splitting a Washington state zone having ZSCs in the only in the Seattle area, into an Eastern zone and a Western zone by adding ZSCs to the Spokane area and directing storage accordingly to provide a Western zone having Seattle ZSCs and an Eastern zone having Spokane ZSCs. Adding a new zone can comprise adding ZSCs, ZSDs, etc., that represent an 'empty' zone, which can indicate that the storage device(s) of the ZSC, etc., does not yet store data for the zone or other zones of the geographically diverse storage construct. Adding a new zone can also comprise adding ZSCs, ZSDs, etc., that do not represent an 'empty' zone, which can indicate that the storage device(s) of the ZSC, etc., already store data.

In an embodiment, it can be desirable to redistribute stored data from some zone(s) into other zone(s) in conjunction with adding a zone, ZSC, etc., to a geographically diverse storage construct. For simplicity and clarity, a new ZSC, as discussed herein, will be treated as an empty zone. However, in some embodiments, a new ZSC can be a non-empty ZSC, e.g., comprising storage device(s) that already comprise stored chunk(s), and all such embodiments are within the scope of the present disclosure even where not explicitly recited for the sake of clarity and brevity. Where a new ZSC is added to a geographically diverse storage system/construct, some data from other zones can be moved to the new ZSC. In an aspect, this can be to redistribute data chunks to provide better geographic diversity. In another aspect, this can be to alter available storage space on ZSCs of the geographically diverse storage construct. In still another aspect, this can be to utilize data store(s) having different attributes, e.g., monetary cost, energy consumption, space or size of the physical storage device(s), reliability of storage device(s), etc. To enable adding of a new zone, ZSC, ZSD, etc., e.g., 'scaling out' a geographically diverse storage construct, a scaling component can utilize information about the geographically diverse storage construct, the new ZSC, etc., network information, supplemental data, etc., to facilitate the scaling out of the geographically diverse storage construct.

In an embodiment, a scaling component can be communicatively coupled to components of the geographically diverse storage construct, e.g., to ZSC(s), etc., and can be employed to determine data redistribution information. As an example, where a new ZSC is added, a scaling component can rank moving data chunks from a nearly full ZSC to the new ZSC to allow more usable space on the nearly full ZSC. As another example, a scaling component can rank moving data to the new ZSC from a ZSC having more expensive storage costs per unit data as greater than moving data than from a ZSC having less expensive storage costs, wherein storage costs can be monetary costs, such as equipment prices, dollars per unit energy, land/building costs, etc., or non-momentary costs, such as, energy consumption levels, environmental impacts, man hours of maintenance, availability of services/utilities/skilled workers, etc.

Data from a first ZSC can be moved to a newly added ZSC. In an aspect, data can be moved from several ZSCs to one or more newly added ZSCs. Moreover, the movement of data can comport with geographically diverse data storage techniques, e.g., moving data can result in data storage that comports with geographic diversity of the stored data. As an example, in an embodiment, this can comprise moving a primary backup chunk and a secondary backup chunk so that they end up in different zones to maintain protection of the backed up data. Similar considerations can be afforded other backups of the primary backup chunk, e.g., 3rd, 4th, etc., backup chunks replicating the primary backup chunk, can be moved to retain geographic diversity.

In an aspect, moving data between zones can comprise copying a primary chunk to a new zone and then deleting the primary chunk at the originating zone, thereby effectively "moving" the copy of the primary at the new zone. In some embodiments, moving can be accomplished bit-by-bit, e.g., a bit is copied and then the original bit is deleted, in effect moving the chunk at the bit level. In other embodiments, moving can be accomplished chunk by chunk, e.g., a whole chunk is copied before the original chunk is deleted. In still other embodiments, other groups of data can be moved via the copy and delete technique, e.g., an entire storage device can be copied before the original is deleted, etc.

As will be appreciated, moving data to a new zone can be network intensive because the data being moved would typically be static in the corresponding resident zone and consume minimal, if any, inter-zone network resources, in contrast to large scale copying of data from one zone to another. Additionally, where a new zone receives the moved data, the writing of that data can be processor intensive and can increase where the new zone can receive data from one or more zones all trying to distribute data to the new zone. In an aspect, a scaling component can regulate data transfers by indicating when any zone can move data to another zone. In an aspect this can schedule data movement to a newly added zone to moderate network use, etc. As an example, data movement can be scheduled to historically slow network use periods, e.g., late at night, on weekends, over holidays, etc. In a further aspect, this can schedule data movement to a newly added zone to moderate processor use, etc. As an example, data movement can be scheduled to allow data influx from a limited number of zones, e.g., one other zone at a time, etc. In this example, where two zones are to move data into a newly added third zone, the data movement can be scheduled to moderate processor use at the third zone by, for example, scheduling data to move from the first zone before moving data from the second zone, to interleave data movement so that some data is moved from the first zone then some data form the second zone, then some more data from the first zone, then some more data form the second zone, etc.

Additionally, originating zones, e.g., zones moving data towards a newly added zone, etc., can perform operations to combine data before moving to alter network usage, processor usage at the new zone, etc. In an aspect, if a first zone is to move data from two chunks to a new zone, the two chunks can be combined, e.g., convolved, etc., as disclosed herein, to consume less storage space prior to moving and, correspondingly, the movement of a combined chunk can consume less network resources and less new zone processor resources in the movement of the combined chunk. The scaling component can indicate which chunks can be combined so as to coordinate data chunk movement to preserve data integrity in the geographically diverse storage construct. As an example, a moving a primary chunk and a secondary chunk in a combined chunk, e.g., the data of the primary and the secondary are combined in the combined chunk, from a first zone to a new zone can be coordinated with moving corresponding chunks from a second zone so that the integrity of the geographically diverse data storage scheme is preserved, e.g., it is generally undesirable to allow combining and/or moving data chunks where it results in data redundancy transitioning a threshold level of redundancy and/or geographic diversity.

In an aspect, a geographically diverse data storage system can be scaled out iteratively, e.g., adding one new ZSC at a time and performing redistribution, etc., based on the single scaled out system before adding an additional ZSC. Additionally, a geographically diverse data storage system can be bulk scaled out, e.g., adding more than one new ZSC at a time then performing redistribution, etc. Bulk scaling out of a geographically diverse data storage system can provide benefits comprising reduced computing resource consumption, e.g., reduced processor loading, reduced network consumption, etc., by determining, e.g., via a scaling component, etc., redistribution, etc., for a bulk scaled out system rather than iterating redistribution, etc., through incremental single ZSC scale out events. In an aspect, bulk scaling out of a system comprises adding one or more ZSCs to the geographically diverse storage system contemporaneously. This can comprise adding two or more ZSCs simultaneously, adding two or more ZSCs non-simultaneously but before initiating redistribution, etc., determining redistribution, etc., operations for a future state of the geographically diverse storage system after scaling out and beginning operations as corresponding ZSCs are added to the system to achieve the future scaled out state, etc. As an example, a geographically diverse storage system can have two new ZSCs added simultaneously and then redistribution, rebalancing, convolution, etc., operations can follow. As another example, a future state of the geographically diverse storage system can comprise the addition of four new ZSCs and, accordingly, redistribution, rebalancing, convolution, etc., operations can be determined for the system having four additional ZSCs, then, as the four ZSCs are added, the determined operations can be correspondingly initiated. Accordingly, bulk scaling out of a geographically diverse storage system can comprise initiating operations prior to all of the expected new ZSCs actually being in service as part of the geographically diverse storage system. In an aspect, these operations can lead to diversification of data storage and can be generally termed diversification operations, data protection scheme operations, rebalancing operations, etc.

Generally, operations corresponding to a bulk scaling out can be different from operations corresponding to iterations of incremental scaling out events. As an example, where first ZSC comprises D1 and D3, second ZSC comprises D2 and D4, and third ZSC comprises D1D2 and D3D4 to protect the data chunks of the first and second ZSCs, when a fourth ZSC is iteratively added, D3 can be moved from first ZSC to fourth ZSC. Accordingly, at third ZSC D3D4 can be deconvolved into D3' and D4' based on also copying D3 from first ZSC to the third ZSC, resulting in third ZSC comprising D1D2, D3', and D4', which can provide redundancy to the now three other ZSCs. Where a fifth ZSC is later iteratively added, D4 can be moved from second ZSC to the fifth ZSC and then D1D2 can be convolved with both of D3' and D4', resulting in third ZSC comprising D1D2D3D4, which can also be written as D1-4, D1-D4, etc., and which can provide protection to the now four other ZSCs. In contrast, for a bulk scale out event where the fourth and fifth ZSC are added before corresponding data operations are initiated, D1D2 and D3D4 can be directly convolved into D1-D4, without replicating either of D3 or D4 into third ZSC, in response to copying of D3 from first ZSC to fourth ZSC and copying of D4 from second ZSC to fifth ZSC. This illustrates that different data operations can occur in response to an iterative scale out as compared to a bulk scale out of a geographically diverse storage system.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate addition of multiple storage zones to a geographically diverse storage system, in accordance with aspects of the subject disclosure. System 100 can comprise first zone storage component (ZSC) 110 that can store data in accord with a geographically diverse storage construct. In an embodiment, ZSC 110 can store data chunks D1, D2, etc. In an embodiment, data chunks D1, D2, etc., can be primary data chunks. In an embodiment, data chunks D1, D2, etc., can be a copy of data. As such, a chunk of data can be data of the same zone, a copy of data from another zone, etc. As an example, data generated in Seattle can be stored in Seattle. As another example, data from a Denver zone ZSC can be backed up in a data chunk in a Seattle zone ZSC, in a Dallas zone ZSC, etc. In an aspect, where the data chunk a backup chunk, other copies of the chunk stored in the same or another ZSC can provide further data redundancy, e.g., a primary chunk can be backed up by a secondary data chunk that represents the data of the primary chunk, which can be backed up by a tertiary data chunk, etc. In an aspect, a secondary chunk can be a copy of the primary chunk. In another aspect, a secondary chunk can be a combined chunk allowing recreation of the primary chunk data, e.g., via deconvolution, etc., as disclosed elsewhere herein. In an aspect, the secondary chunk can be stored on the same or different zone, although generally, for geographic diversity, the secondary chunk would typically be stored on another zone. Accordingly, first ZSC 110, in an embodiment, can store data chunks 131-139, etc. Similarly, second ZSC 120 can store chunks D2, D4, etc.

In an embodiment, third ZSC 130 can store chunks D1D2, D3D4, etc. In an aspect D1D2 can be a convolved chunk representing data stored in D1 and D2, e.g., D1D2 can be deconvolved with D1 or a copy of D1, e.g., D1', to recover a copy of D2, e.g., D2'. Similarly, D1D2 can be deconvolved with D2 or a copy of D2, e.g., D2', to recover a copy of D1, e.g., D1'. As such, D1D2 and D3D4 can provide protection against the loss of either first ZSC 110 or second ZSC 120 by allowing recover of the lost data from the convolved chunks and corollary data stored on the remaining ZSC. As an example, where first ZSC 110 become less available, D2 can be employed with D1D2 to recover D1 and D4 can be employed with D3D4 to recover D3, etc. Similarly, D2 and D4 can be recovered where second ZSC 120 becomes less available by employing D1, D3, D1D2, and D3D4. Moreover, where third ZSC 130 becomes less available, D1, D2, D3, and D4 can still be accessible via first ZSC 110 and second ZSC 120.

System 100 can comprise scaling component 190 that can be communicatively coupled, e.g., via communication framework 102, etc., to ZSCs of system 100, e.g., ZSCs 110-140, etc. It will be noted that in some embodiments, communication framework 102 can also enable communication between the ZSCs of system 100. Scaling component 190 can determine which chunks to move to preserve a threshold level of data redundancy, a threshold level of geographic diversity, a threshold level of network resource consumption, monetary cost, processor resource consumption, etc. In an aspect, scaling component 190 can provide information, or an indication, related to bulk addition of new zones, ZSCs, ZSDs, etc. As an example, where geographic diversity in a three zone system is determined to satisfy a diversity rule, scaling component 190 can indicate that fourth ZSC 140 and fifth ZSC 150 should be added. In some embodiments, one or more of these added ZSCs, e.g., fourth ZSC 140, fifth ZSC 150, etc., can be a new zone, e.g., a zone that was not previously part of system 100, did not previously store data of system 100, etc. In some embodiments, one or more of these added ZSCs, e.g., fourth ZSC 140, fifth ZSC 150, etc., can be a dormant zone, e.g., a zone that was comprised in the geographically diverse storage system but can have been unused, less used, etc., and that can be activated, brought into use, used more, etc., for example, in response to a determination by scaling component 190, etc. In an embodiment, scaling component 190 can be can be comprised in a ZSC, e.g., ZSC 110-150, etc., can be located separate from a ZSC, can be located remotely from a ZSC, can be both separate from, and located far from, a ZSC, etc. In an embodiment, scaling component 190 can be comprised in more than one ZSC, e.g., scaling component 190 can be a distributed component, a redundant component, an instance of a scaling component, etc., comprised in more than one ZSC of the geographically diverse storage system.

As is illustrated in system 100, newly added ZSCs, e.g., 140, 150, etc., can comprise an empty ZSC that can be available to receive data from other ZSCs or from customers. In an aspect, the movement of data chunks into one or more of the newly added ZSCs can result from determinations at scaling component 190. In an embodiment, scaling component 190 can schedule movement of one or more chunks into one or more of the newly added ZSCs in a manner that comports with a geographically diverse storage construct, satisfies cost/resource rules, etc. As an example, scaling component 190 can indicate that all data transfers can occur in low network usage periods, that chunks are moved, copied, combined, convolved, etc., where it can improve, alter, etc., geographic diversity, that data operations are at scheduled times, for example to reduce processor loading, etc. Numerous other examples of scaling component 190 coordinating data movement are readily appreciated and all are considered within the scope of the instant disclosure even where not expressly recited for the sake of clarity and brevity.

Figure 2:
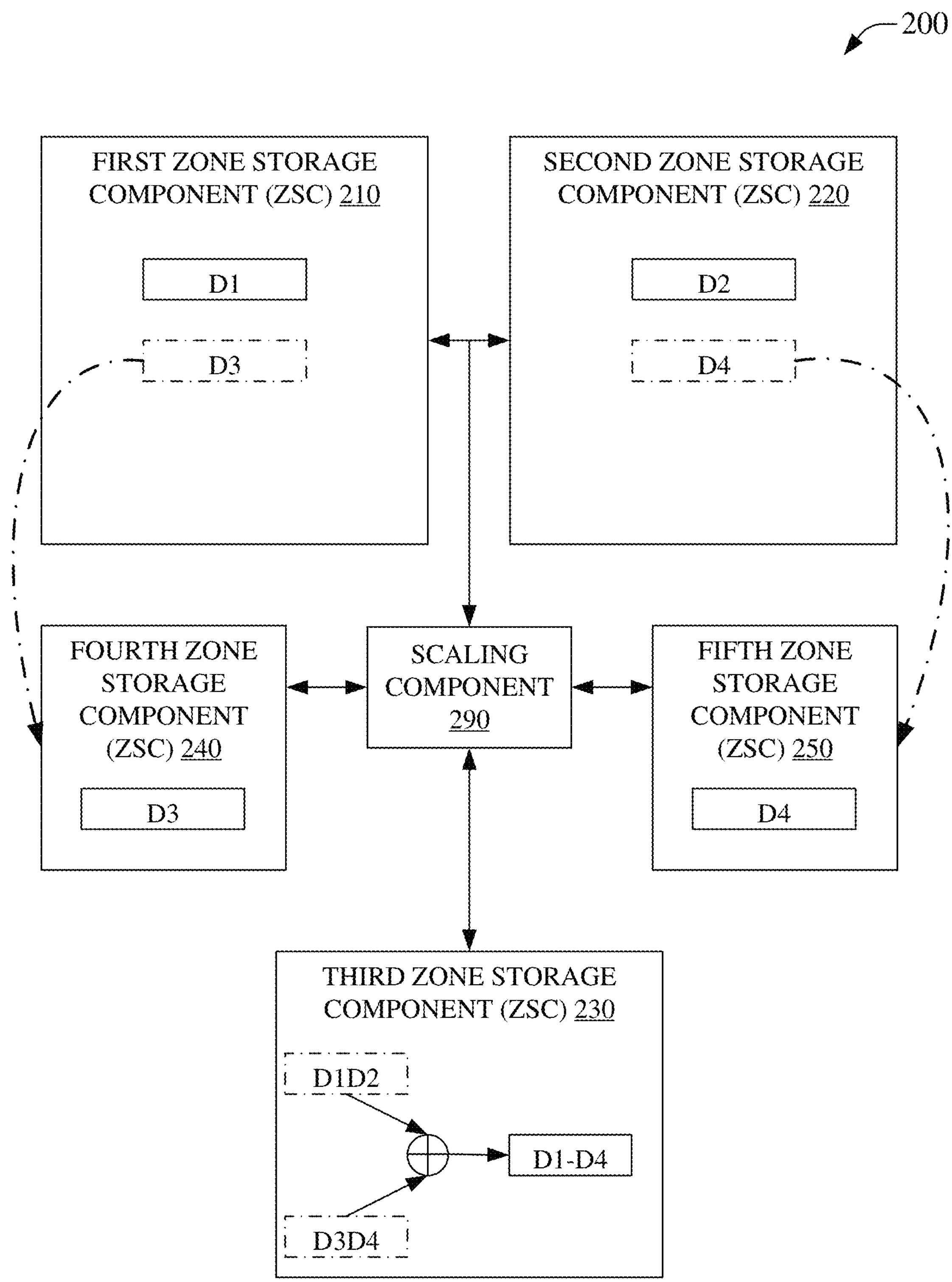
FIG. 2 is an illustration of an example system that can facilitate diversification of data storage via addition of multiple storage zones to a geographically diverse storage system, in accordance with aspects of the subject disclosure.

FIG. 2 is an illustration of a system 200, which can facilitate diversification of data storage via addition of multiple storage zones to a geographically diverse storage system, in accordance with aspects of the subject disclosure. System 200 can comprise first through fifth ZSC, e.g., ZSCs 210-250, etc. Scaling component 290 can facilitate diversification operations, e.g., moving, copying, combining, convolving, de-convolving, deleting, etc., data, data fragments, data chunks, etc., associated with updating data storage in accord with a data protection scheme in response to a bulk scaling out event where multiple ZSCs are added to a geographically diverse storage system.

In an embodiment, first ZSC 210 can store data chunks, for example D1, D3, etc., prior to scaling out. Similarly, prior to scaling out, second ZSC 220 can store data chunks, for example, D2, D4, etc. Correspondingly, to provide data protection before scaling out, third ZSC 230 can store redundant data chunks, for example, D1D2 and D3D4, which can be, in this example, convolved chunks to conserve storage space.

A scaling out event for system 200 can comprise, for example, contemporaneously adding both fourth ZSC 240 and fifth ZSC 250. In this example, ZSCs 240 and 250 can be empty ZSCs, however as disclosed elsewhere herein, empty or non-empty ZSCs can also be added, made available, brought online, etc., as part of a bulk scaling out event in system 200. As illustrated, the addition of the example two new ZSCs can enable system 200 to employ a more diversified data storage scheme that can also consume less storage space than before the bulk scaling out event. As an example, D3 can be moved from first ZSC 210 to fourth ZSC 240, D4 can be moved from second ZSC 230 to fifth ZSC 250, and convolved chunks D1D2 and D3D4 can be further convolved at third ZSC 230 to yield D1-D4. In this example, data chunks D1 through D4 are more diversely stored in different geographical areas and the total storage used goes from six chunks of storage to five chunks of storage via the further convolution of D1D2 and D3D4 to D1-D4. This can represent an improvement in the storage of data, e.g., loss of any one zone after bulk scaling out can be recovered from the remaining zones and the total storage used is reduced.

It is noted that prior to the bulk scaling out, D1D2 and D3D4 could not be convolved into D1-D4 without risking a data loss event from a zone becoming less accessible. Where D1D2 and D3D4 were to be convolved into D1-D4 in system 200 prior to the bulk scaling out, e.g., with just ZSCs 210-230, then the loss of a zone would cause loss of access to some data. As an example, if ZSC 210 becomes less accessible, then D2 and D4 can be used with D1-D4 to recover only D1D3, where D1D3 is not D1 and D3 but is rather a convolution of D1 and D3. Similarly, in an example where ZSC 220 becomes less accessible, then D1 and D3 can be used with D1-D4 to recover only D2D4, where D2D4 is not D2 and D4 but is rather a convolution of D2 and D4. As such, prior to the bulk scaling out of system 200, D1D2 and D3D4 cannot be safely convolved into a single chunk D1-D4. However, after the bulk scaling out of system 200, an example loss of ZSC 210, e.g., loss of access to D1, can be recovered by de-convolving D1-D4 with D2, D3, and D4 to yield D1', where each of D2, D3, and D4 are accessible on ZSCs 220, 240, and 250 correspondingly, and D1-D4 is available on ZSC 230.

Figure 3:
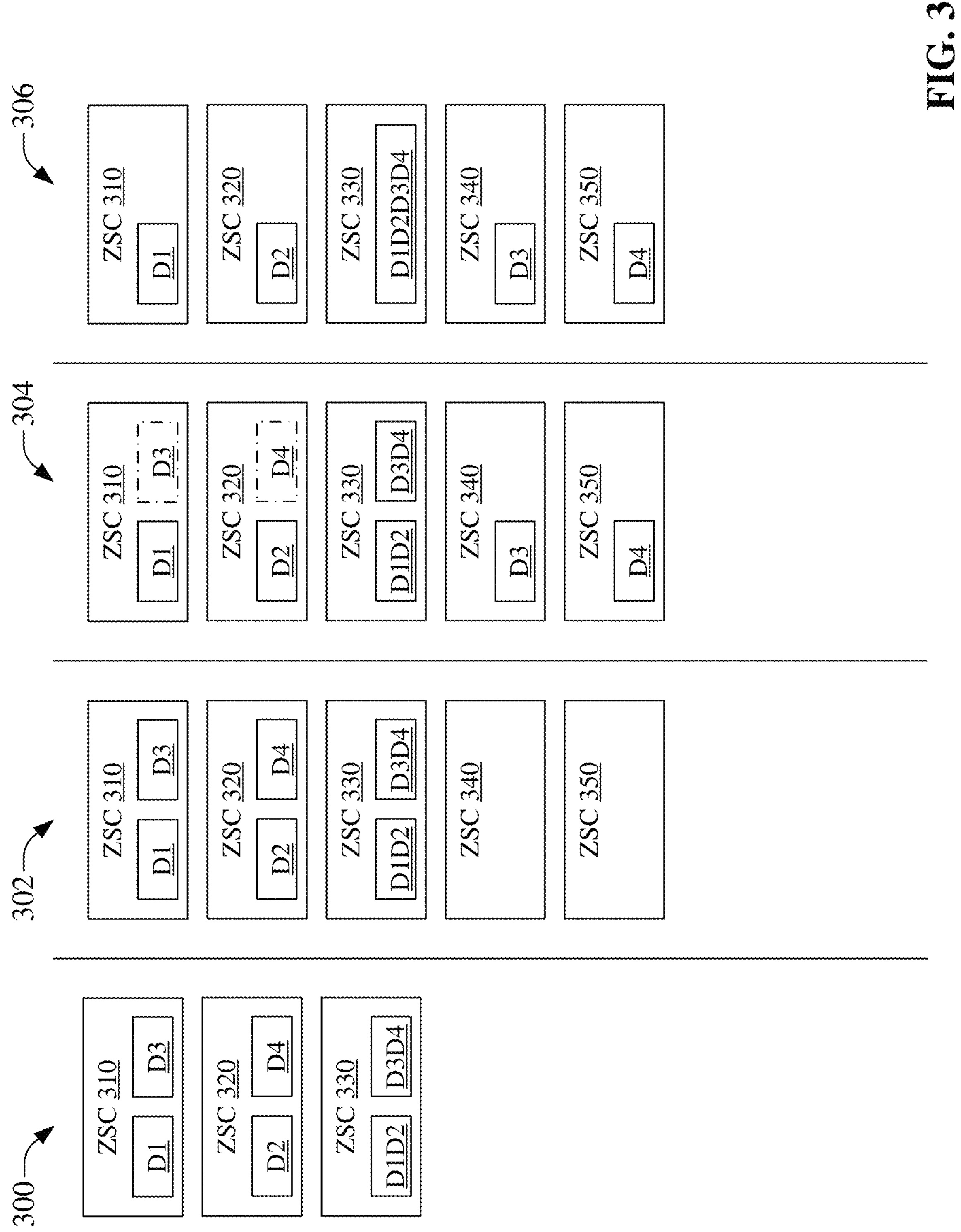
FIG. 3 is an illustration of example system states that can facilitate diversification of data storage via addition of multiple storage zones to a geographically diverse storage system, in accordance with aspects of the subject disclosure.

FIG. 3 is an illustration of example system states, e.g., states 300-306, that can facilitate diversification of data storage via addition of multiple storage zones to a geographically diverse storage system, in accordance with aspects of the subject disclosure. System state 300 can illustrate a geographically diverse storage system that can comprise first ZSC 310, second ZSC 320, third ZSC 330, etc. The ZSCs can store data, e.g., data chunks, for example, ZSC 310 can store chunks D1 and D3, ZSC 320 can store chunks D2 and D4, and ZSC 330 can store chunks D1D2 and D3D4 which can be convolved chunks providing data protection.

At state 302, the geographically diverse storage system can undergo a bulk scaling out event that can result in the addition of additional zones, e.g., ZSC 340, ZSC 350, etc. In an aspect, the zones added as part of the scaling out event can comprise empty ZSCs, non-empty ZSCs, etc., as disclosed elsewhere herein. As can be seen, the additional ZSCs result in a geographically diverse storage system that is somewhat unbalanced, e.g., some zones comprise multiple chunks and some zones comprise no chunks. Diversifying the storage of chunks can result in improved performance of the example geographically diverse storage system. As an example, spreading the chunks across the available ZSCs can result in the recoverable loss of fewer chunks, e.g., loss of ZSC 310 can result in losing D1 and D3 before spreading data (at 302) but can result in the loss of only D1 after spreading (at 304). As another example, lower recovery times for lost data can also occur, e.g., deconvolving convolved chunks to recover less compromised data can occur faster than deconvolving convolved chunks to recover more compromised data. As a further example of improved system performance, where the system is bulk scaled out due to existing zones approaching, or reaching, their storage limit, e.g., becoming full, then diversifying can increase the available storage space on those zones after the bulk scaling out. In an aspect, the benefits of this example can be important given a location of the zone, e.g., where a Miami zone is becoming full from Miami and Dallas data, moving Dallas data to newly added Sacramento and Seattle zones can allow for more Miami data to be stored at the Miami zone which can have network transport benefits for the Miami data.

At 304, the geographically diverse storage system can perform data operations based on the bulk scaled out geographically diverse storage system. As an example, D3 can be moved from ZSC 310 to ZSC 340. Similarly, for example, D4 can be moved from ZSC 320 to ZSC 350. In an embodiment, moving data can comprise first duplicating a data chunk then deleting/freeing the source data chunk, e.g., for moving D3 from ZSC 310 to ZSC 340, the D3 chunk can be duplicated at ZSC 340, then the D3 chunk at ZSC 310 can be deleted, freed, etc. In another embodiment, moving data can comprise directly moving data, e.g., portions of a chunk are deleted/freed as it is written to the destination, for example, parts of the D3 chunk can be deleted as those parts are written into the destination chunk at ZSC 340. Other techniques for moving data can also be applicable and are considered within the scope if the instant disclosure even where not explicitly recited for the sake of clarity and brevity.

While it can be observed that state 304 is more evenly distributed and more diversified, it will be appreciated that D1D2 and D3D4 consume two chunks worth of storage space. Storing D1D2 and D3D4 does provide adequate redundancy to protect the data of ZSCs 310, 320, 340, and 350 as illustrated, however, these chunks can be convolved to be more storage space efficient. As such, at 306, D1D2 and D3D4 can be convolved to D1D2D3D4, which can consume one chunk of storage space rather than the two chunks of storage space previously consumed by D1D2 and D3D4. In an aspect, this condensing of D1D2 and D3D4 into D1-4 can be related to determining that a rule is satisfied, for example, based on a processor usage rule, e.g., where there are adequate available processor resources, the chunks can be condensed, etc. In an aspect, condensing the chunks, for example, can be scheduled to times of lower computing resource consumption, etc.

Figure 4:
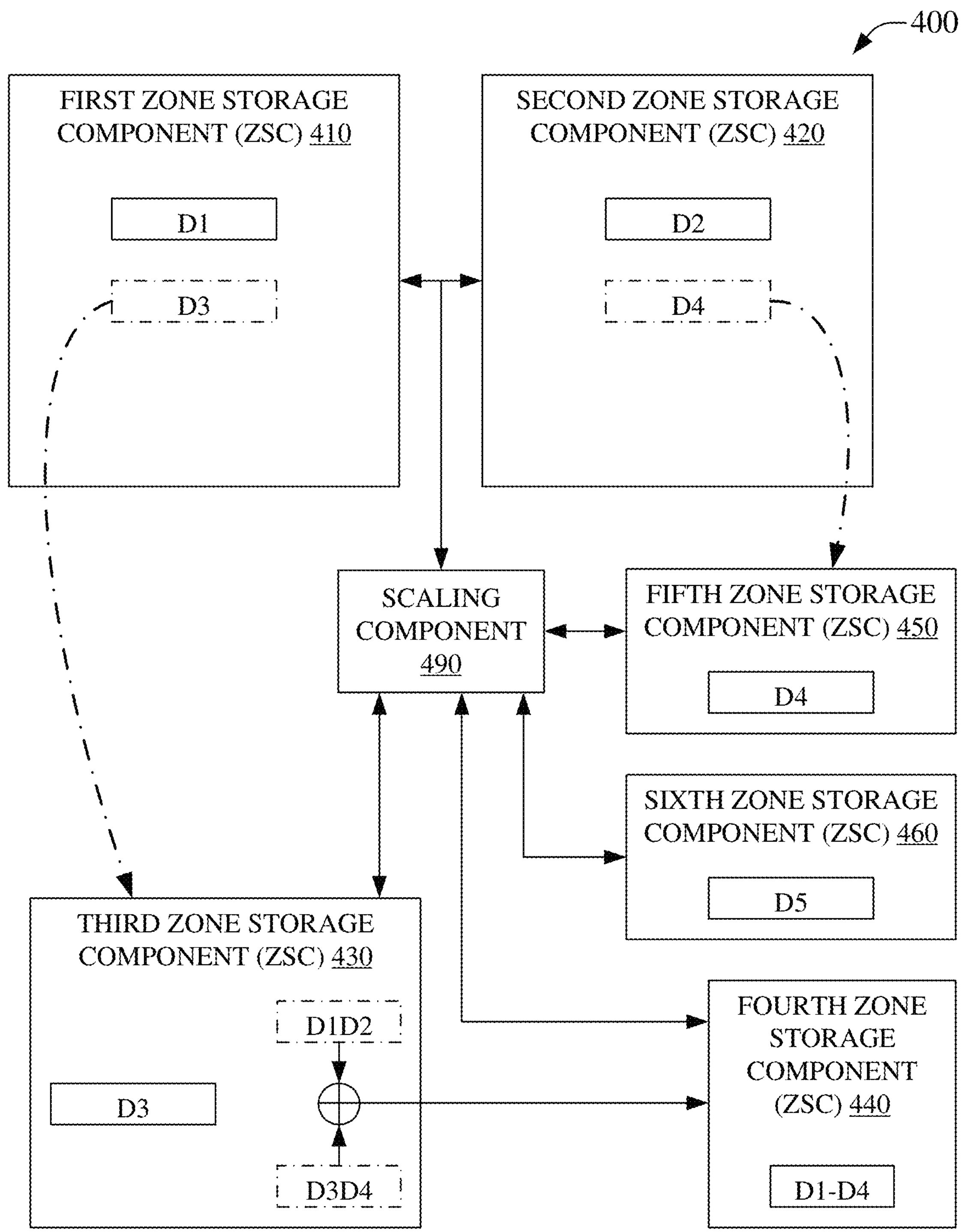
FIG. 4 is an illustration of an example system that can enable an alternate diversification of data storage via addition of multiple storage zones to a geographically diverse storage system, in accordance with aspects of the subject disclosure.

FIG. 4 is an illustration of a system 400, which can facilitate an alternate diversification of data storage via addition of multiple storage zones to a geographically diverse storage system, in accordance with aspects of the subject disclosure. System 400 can comprise first through sixth ZSC, e.g., ZSCs 410-460, etc. Scaling component 490 can facilitate diversification operations, e.g., moving, copying, combining, convolving, de-convolving, deleting, etc., data, data fragments, data chunks, etc., associated with updating data storage in accord with a data protection scheme in response to a bulk scaling out event where multiple ZSCs are added to a geographically diverse storage system.

In an embodiment, first ZSC 410 can store data chunks, for example D1, D3, etc., prior to scaling out. Similarly, prior to scaling out, second ZSC 420 can store data chunks, for example, D2, D4, etc. Correspondingly, to provide data protection before scaling out, third ZSC 430 can store redundant data chunks, for example, D1D2 and D3D4, which, in this example, can be convolved chunks to conserve storage space.

As was noted for system 200, prior to bulk scaling out, D1D4 and D3D4 should not be convolved into D1-D4 because this causes a risk of a data loss event from a zone becoming less accessible. Again, if D1D2 and D3D4 were to be convolved into D1-D4 in system 400 prior to a bulk scaling out, e.g., with just ZSCs 410-430, then the loss of a zone would cause loss of access to some data, e.g., if ZSC 410 becomes less accessible, deconvolution of D1-D4 can lead to D1D3, where D1D3 is not D1 and D3 but is rather a convolution of D1 and D3, and if ZSC 420 becomes less accessible, then D2D4 can be recovered, but again, D2D4 is not D2 and D4, but is rather a convolution of D2 and D4. As such, prior to the bulk scaling out of system 400, D1D2 and D3D4 cannot be safely convolved into a single chunk D1-D4. However, as is illustrated, after bulk scaling out of system 400, D1D2 and D3D4 can be safely convolved into D1-D4 to conserve storage space.

A scaling out event for system 400 can comprise, for example, contemporaneously adding fourth ZSC 440, fifth ZSC 450, and sixth ZSC 260. In this example, ZSCs 440, 450, and 460, can be empty ZSCs, however as disclosed elsewhere herein, empty or non-empty ZSCs can be added, made available, brought online, etc., as part of a bulk scaling out event in system 400. As illustrated, the addition of the example three new ZSCs can enable system 400 to employ a more diversified data storage scheme that can also consume less storage space than before the bulk scaling out event. As an example, D3 can be moved from first ZSC 410 to third ZSC 430, D4 can be moved from second ZSC 430 to fifth ZSC 450, and convolved chunks D1D2 and D3D4 can be further convolved to D1-D4 at fourth ZSC 430. In this example, data chunks D1 through D4 are more diversely stored in different geographical areas and the total storage used goes from six chunks of storage to five chunks of storage via the further convolution of D1D2 and D3D4 to D1-D4. This can represent an improvement in the storage of data, e.g., loss of any one zone after bulk scaling out can be recovered from the remaining zones and the total storage used is reduced. Moreover, where new data D5 is added to sixth ZSC 460, then D1-D4 at fourth ZSC 440 can be further convolved with a copy of D5, e.g., D5', to yield D1-D5, although this is not depicted in the figure for clarity and brevity.

Figure 5:
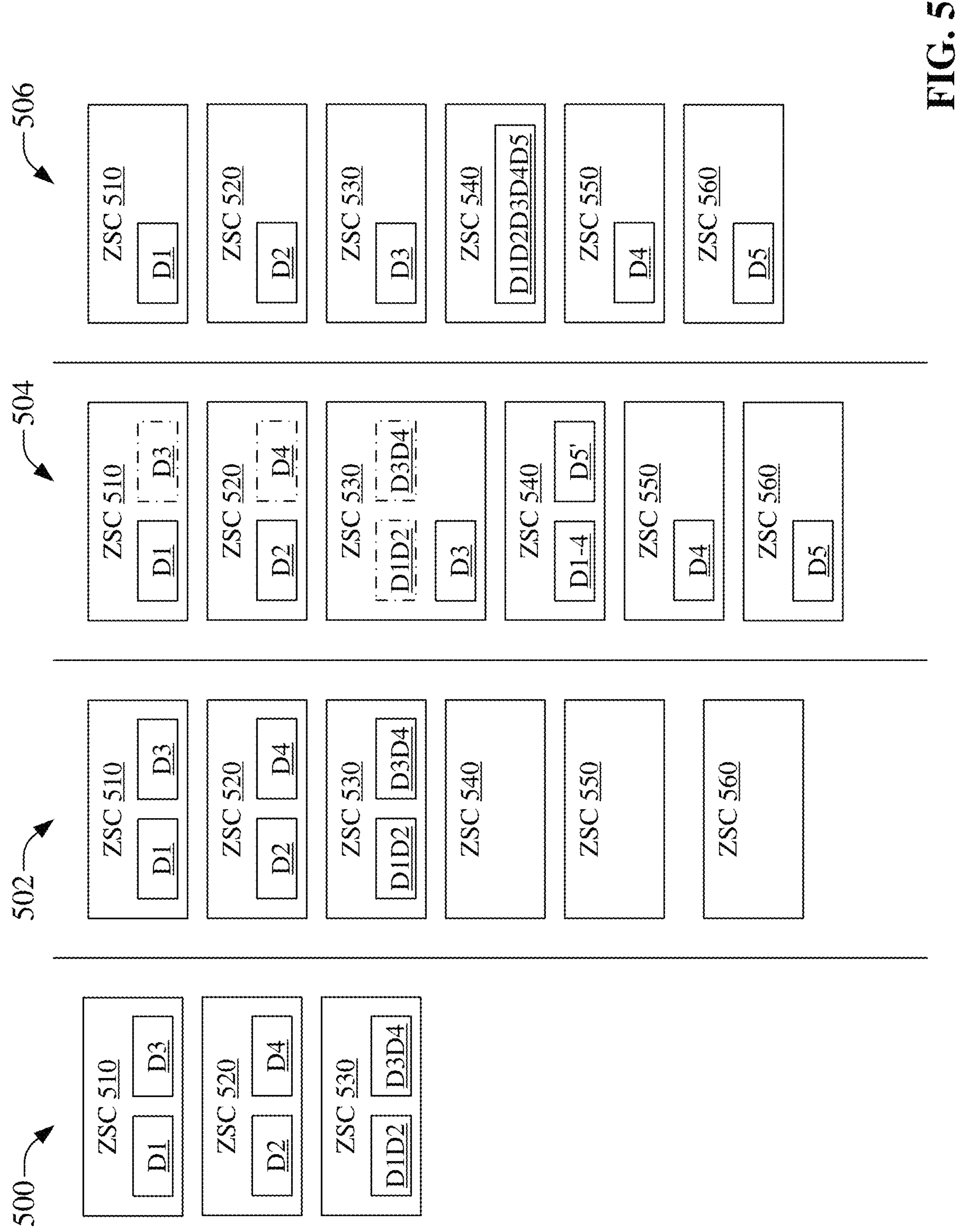
FIG. 5 is an illustration of example system states that can facilitate an alternate diversification of data storage via addition of multiple storage zones to a geographically diverse storage system, in accordance with aspects of the subject disclosure.

FIG. 5 is an illustration of example system states, e.g., states 500-508, that can facilitate an alternate diversification of data storage via addition of multiple storage zones to a geographically diverse storage system, in accordance with aspects of the subject disclosure. Example state 500 can illustrate ZSC 510 can illustrate a geographically diverse storage system that can comprise first ZSC 510, second ZSC 520, third ZSC 530, etc. The ZSCs can store data, e.g., data chunks, for example, ZSC 510 can store chunks D1 and D3, ZSC 520 can store chunks D2 and D4, and ZSC 530 can store chunks D1D2 and D3D4 which can be convolved chunks providing data protection.

At state 502, the geographically diverse storage system can undergo a bulk scaling out event that can result in the addition of additional zones, e.g., ZSC 540, ZSC 550, ZSC 560, etc. In an aspect, the zones added as part of the scaling out event can comprise empty ZSCs, non-empty ZSCs, etc., as disclosed elsewhere herein. As can be seen, the additional ZSCs result in a geographically diverse storage system that is somewhat unbalanced, e.g., some zones comprise multiple chunks and some zones comprise no chunks. Diversifying the storage of chunks can result in improved performance of the example geographically diverse storage system.

At 504, the geographically diverse storage system can perform data operations based on the bulk scaled out geographically diverse storage system. As an example, D3 can be moved from ZSC 510 to ZSC 530. Similarly, for example, D4 can be moved from ZSC 520 to ZSC 550. Where D3 in now at ZSC 530, storing D1D2 and D3D4 in the same ZSC 530 does not provide adequate redundancy to protect the data of ZSCs 510, 520, and 540 because the loss of ZSC 530 would result in the permanent loss of D3. As such in this example, D1D2 and D3D4 can be convolved to D1D2D3D4, which can be written to ZSC 550. This can result in acceptable diversity and data protection while also consuming less storage space, e.g., five chunks of storage space across five ZSCs after bulk scaling out, rather than six chunks of storage space across three ZSCs before bulk scaling out.

At 504 it can be further observed that new data chunk D5 can be stored by the geographically diverse storage system, e.g., at ZSC 560. This new data chunk can be protected by creating copy, e.g., D5', at another ZSC, e.g., ZSC 540. However, because the bulk scale out added sufficient new ZSCs, it can be observed that D1-4 and D5' can be convolved without loss of data protection and with the benefit of consuming less storage space. As such, at state 506, geographically diverse storage system, for example, can cause convolution of D1-4 with D5' at ZSC 540, resulting in convolved chunk D1D2D3D4D5. Example D1D2D3D4D5 can be deconvolved to recover against the loss of any one of ZSCs 510, 520, 530, 550, or 560.

Figure 6:
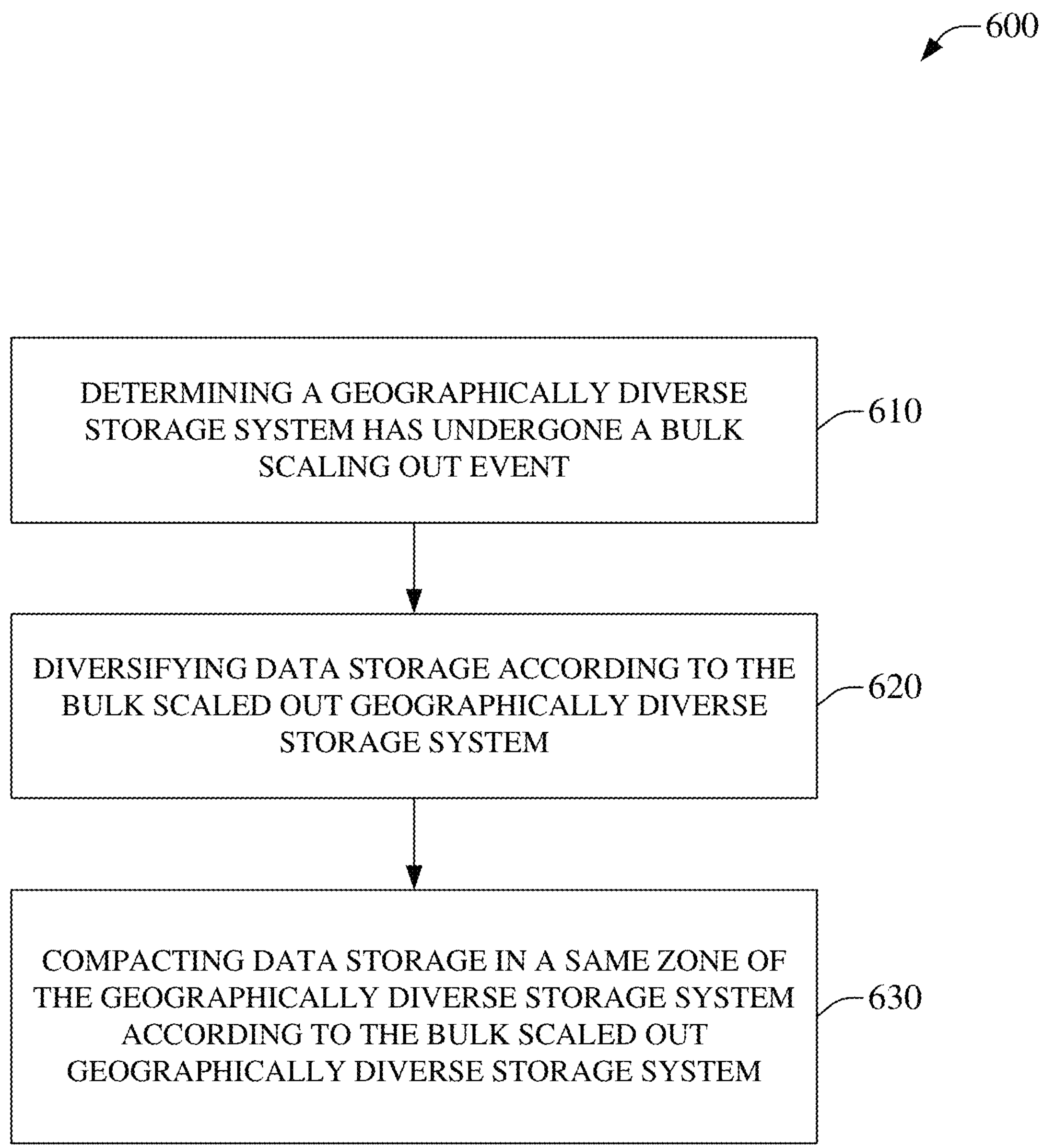
FIG. 6 is an illustration of an example system that can enable diversifying data storage via addition of multiple storage zones to a geographically diverse storage system, in accordance with aspects of the subject disclosure.
Figure 7:
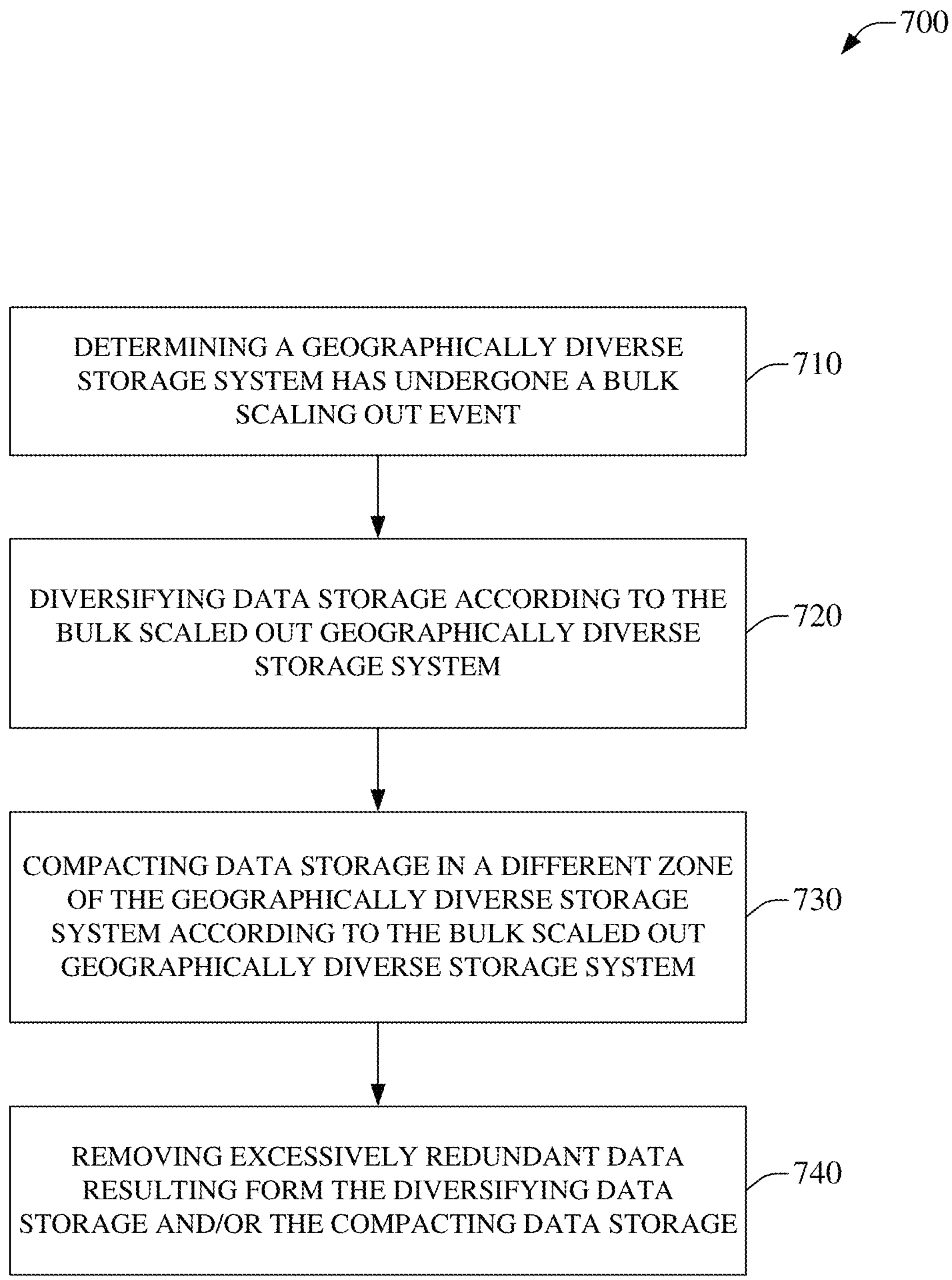
FIG. 7 is an illustration of an example method facilitating an alternate diversification of data storage via adding multiple storage zones to a geographically diverse storage system, in accordance with aspects of the subject disclosure.
Figure 8:
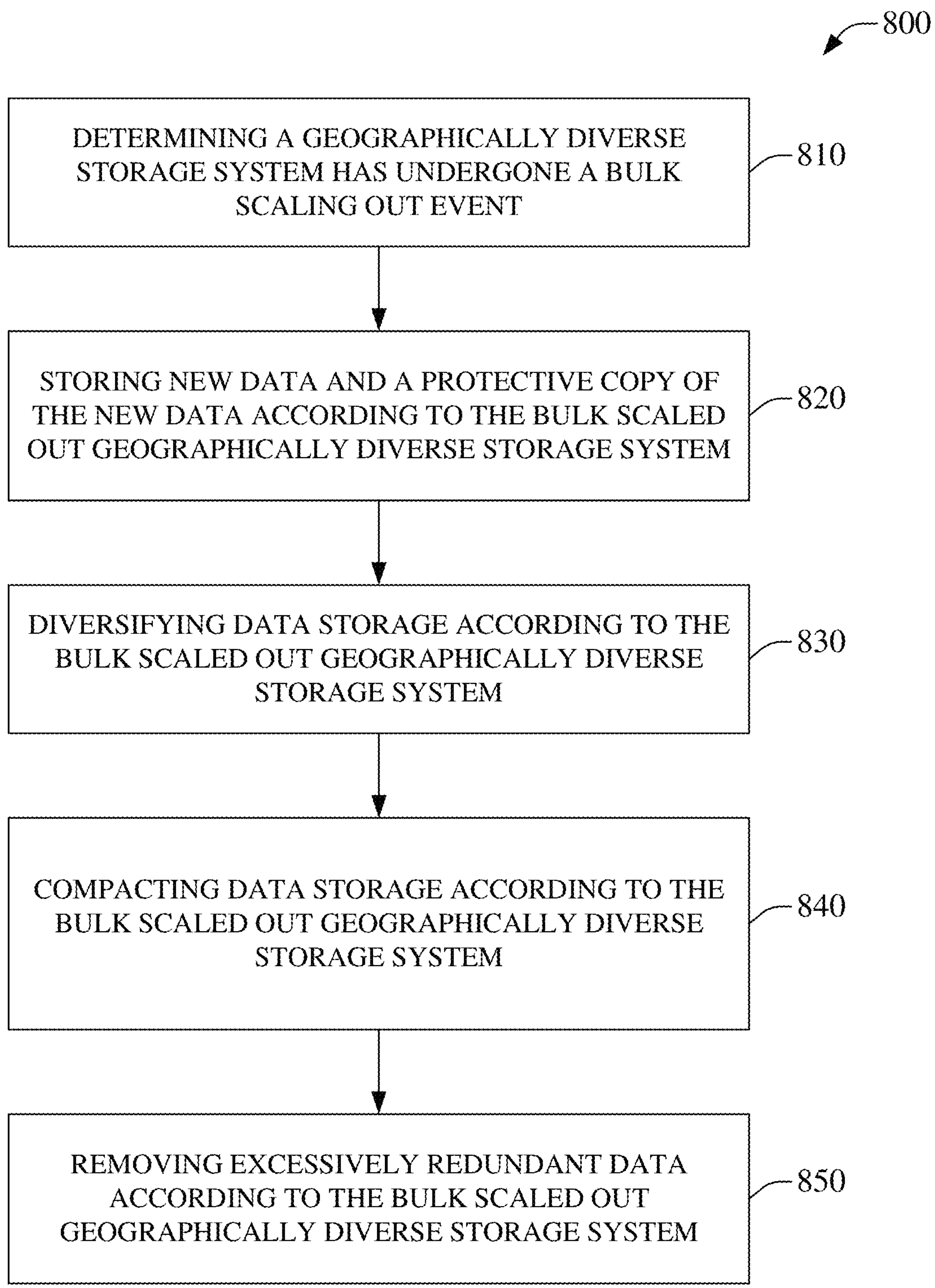
FIG. 8 illustrates an example method that enables contemporaneously storing new data and diversifying data storage via addition of multiple storage zones to a geographically diverse storage system, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can enable diversifying data storage via addition of multiple storage zones to a geographically diverse storage system, in accordance with aspects of the subject disclosure. At 610, method 600 can comprise determining that a geographically diverse storage system has undergone a bulk scaling out event. A bulk scaling out event can result in the addition of two or more zones to the geographically diverse storage system, e.g., two or more new ZSCs can be added to the existing ZSCs of the geographically diverse storage system. Bulk scaling out of a geographically diverse data storage system can provide benefits comprising reduced computing resource consumption in comparison to an incremental scaling out of the system. In an aspect, bulk scaling out of a system comprises adding one or more ZSCs to the geographically diverse storage system contemporaneously. This can comprise adding two or more ZSCs simultaneously, adding two or more ZSCs non-simultaneously but before initiating data operations according to the scaled out system, determining initiating data operations according to a future state of the scaled out system, e.g., a state after the scaling out, etc.

At 620 of method 600, data storage can be diversified according to the scaled out geographically diverse storage system. In an aspect, this can comprise moving, copying, duplicating, combining, convolving, etc., data fragments, data chunks, etc., from the zones before the bulk scaling out event among the zones that can be present after the bulk scaling out event. As an example, a data chunk can be moved from an old ZSC, e.g., a ZSC existing before the scaling out, to a new ZSC, e.g., a ZSC existing after the scaling out event. This example can be embodied in the moving of D3 from first ZSC 210 to fourth ZSC 240 in system 200. A more diversified distribution of stored data can result in improved performance of the geographically diverse storage system, as noted elsewhere herein, for example, faster access to data, faster recovery of compromised data, loss of less data if a zone becomes less accessible, lower monetary costs or other costs of data storage, etc. As an example, the loss of ZSC 310 at state 300 can result in loss of D1 and D3, which can be recovered from the data of ZSC 320 and 330, while in contrast the loss of ZSC 310 at state 306 can result in the loss of only D1, which can also be recovered, e.g., from ZSC 320 through 340.

At 630, method 600 can comprise compacting data storage in a same zone of the geographically diverse storage system according to the bulk scaled out geographically diverse storage system. At this point method 600 can end. In an aspect, diversification of data storage at 620 can result in storage of data that can be protected by more convolved redundant chunk(s). As an example, At state 300, the data of ZSC 310 and 320, e.g., D1, D2, D3, and D4, can be protected by two chunks, e.g., D1D2 and D3D4 at ZSC 330, while in contrast, the same data, e.g., D1, D2, D3, and D4, distributed across four ZSCs, e.g., 310, 320, 340, and 350, can be protected by only one chunk, e.g., D1D2D3D4 at ZSC 330. This example can represent needing to consume only half of the storage space of a pre-bulk scaling out event to provide protection for the same data chunks after the bulk scaling out event.

FIG. 7 is an illustration of an example method 700, which can facilitate an alternate diversification of data storage via adding multiple storage zones to a geographically diverse storage system, in accordance with aspects of the subject disclosure. At 710, method 700 can comprise determining that a geographically diverse storage system has undergone a bulk scaling out event. A bulk scaling out event can result in the addition of two or more zones to the geographically diverse storage system, e.g., two or more new ZSCs can be added to the existing ZSCs of the geographically diverse storage system.

Method 700, at 720, can comprise diversifying data storage according to the scaled out geographically diverse storage system. In an aspect, this can comprise moving, copying, duplicating, combining, convolving, etc., data fragments, data chunks, etc., from the zones before the bulk scaling out event among the zones that can be present after the bulk scaling out event. As an example, a data chunk can be moved from an old ZSC, e.g., a ZSC existing before the scaling out, to another ZSC, e.g., another old ZSC, a new ZSC, etc. This example can be embodied in the moving of D3 from first ZSC 410 to third ZSC 430 in system 400, where third ZSC 430 was comprised in the system before the scaling out event. The more diversified distribution of stored data can result in improved performance of the geographically diverse storage system, again as noted elsewhere herein. However, the diversifying can also result in a condition that can put some data at risk, for example, where D3 was moved from ZSC 410 to ZSC 430 in system 400, D3 is at risk of a data loss event where ZSC 430 becomes less accessible. Accordingly, the protection chunks, e.g., D1D2 and D3D4 can be moved, compacted, etc., in a manner consistent with providing sufficient data protection in view of the diversifying at 720.

At 730, method 700 can comprise compacting data storage in a different zone of the geographically diverse storage system according to the bulk scaled out geographically diverse storage system. In an aspect, diversification of data storage at 720 can result in storage of data that can be under-protected. As such, compacting, e.g., convolving data, etc., protection chunks to a different zone can be employed to provide adequate protection via more convolved redundant chunk(s). As an example, at state 500, the data of ZSC 510 and 520, e.g., D1, D2, D3, and D4, can be protected by two chunks, e.g., D1D2 and D3D4 at ZSC 530 in state 500, while in contrast, the same data, e.g., D1, D2, D3, and D4, distributed across four ZSCs, e.g., 510, 520, 530, and 550, can be less protected at state 504 and, accordingly, D1D2 and D3D4 can be convolved into D1D2D3D4 at ZSC 540 in state 504 to provide satisfactory protection of the data chunks D1 through D4. It is noted that in moving D3 from ZSC 510 to ZSC 530, a copy can be made at ZSC 530 while the original is kept at ZSC 510 to provide data protection. However, this can result in excessive copies of data, e.g., once D1D2D3D4 is stored at ZSC 540 in state 504, D3 at ZSC 510 is no longer needed to provide protection to D3 at ZSC 530 and, accordingly, the excessively redundant chunks can be correspondingly cleaned up.

Method 700, at 740, can comprise removing excessively redundant data. At this point method 700 can end. Excessively redundant data can result from the diversifying and/or the compacting of data storage at 720 and/or 730. As has been noted, moving data can comprise creating duplicates of data in other zones before deleting/freeing the original data, similarly, deletion of the original data can be delayed until it is determined that a data protection rule has been satisfied. As an example, when moving D3 in system 400, the original D3 can persist at first ZSC 410 until both the copy is created at third ZSC 430 and a data protection rule is determined to be satisfied, e.g., the data protection rule can be determined to be satisfied after D1-D4 is created at fourth ZSC 440 in system 400. After the data protection rule is determined to be satisfied and the data has been 'moved' to the new zone, the original D3 at first ZSC 410 can be deleted, freed, etc.

FIG. 8 is an illustration of an example method 800, which can enable contemporaneously storing new data and diversifying data storage via addition of multiple storage zones to a geographically diverse storage system, in accordance with aspects of the subject disclosure. At 810, method 800 can comprise determining that a geographically diverse storage system has undergone a bulk scaling out event. A bulk scaling out event can result in the addition of two or more zones to the geographically diverse storage system, e.g., two or more new ZSCs can be added to the existing ZSCs of the geographically diverse storage system.

Method 800, at 820, can comprise storing new data, e.g., a new data chunk, and a protective copy of the new data according to the scaled out geographically diverse storage system. As an example, new data chunk D5 can be stored at ZSC 560 and a copy, D5', can be stored at ZSC 540 in system state 504. This new data can be new customer generated data that can be stored according to the scaled out geographically diverse storage system. Accordingly, protection of the new data can also be according to the scaled out geographically diverse storage system. In an aspect, this can comprise creating a duplicate, e.g., D5' in state 504, combining the data represented by D5 into a convolved chunk as is appropriate under the scaled out geographically diverse storage system as in state 506, or other appropriate data protection.

Method 800, at 830, can comprise diversifying data storage according to the scaled out geographically diverse storage system. In an aspect, this can comprise moving, copying, duplicating, combining, convolving, etc., data fragments, data chunks, etc., from the zones before the bulk scaling out event among the zones that can be present after the bulk scaling out event. As an example, a data chunk can be moved from an old ZSC, e.g., a ZSC existing before the scaling out, to another ZSC, e.g., another old ZSC, a new ZSC, etc. This example can be embodied in the moving of D4 from first ZSC 420 to fifth ZSC 450 in system 400, where fifth ZSC 450 is a newly added ZSC from the scaling out of the geographically diverse storage system. The more diversified distribution of stored data can result in improved performance of the geographically diverse storage system, again as noted elsewhere herein. However, the diversifying can also result in a condition that can put some data at risk, again for example, where D3 was moved from ZSC 410 to ZSC 430 in system 400, D3 is at risk of a data loss event where ZSC 430 becomes less accessible. Accordingly, the protection chunks, e.g., D1D2 and D3D4 can be moved, compacted, etc., in a manner consistent with providing sufficient data protection in view of the diversifying at 820.

At 840, method 800 can comprise compacting data storage in a different zone of the geographically diverse storage system according to the bulk scaled out geographically diverse storage system. In an aspect, diversification of data storage at 820 can result in storage of data that can be under-protected. As such, compacting, e.g., convolving data, etc., protection chunks to a different zone can be employed to provide adequate protection via more convolved redundant chunk(s). As an example, at state 500, the data of ZSC 510 and 520, e.g., D1, D2, D3, and D4, can be protected by two chunks, e.g., D1D2 and D3D4 at ZSC 530 in state 500, while in contrast, the same data, e.g., D1, D2, D3, and D4, distributed across four ZSCs, e.g., 510, 520, 530, and 550, can be less protected at state 504 and, accordingly, D1D2 and D3D4 can be convolved into D1D2D3D4 at ZSC 540 in state 504 to provide satisfactory protection of the data chunks D1 through D4. Further, additional compacting can be accomplished in view of the storing of new data at 820. As an example, D1-4 can be convolved with D5' at state 506 to provide protection for new data D5 store at ZSC 560. It is again noted that in moving D3 from ZSC 510 to ZSC 530, a copy can be made at ZSC 530 while the original is kept at ZSC 510 to provide data protection. Moreover, combining D5' with D1-4 can also result in retention of D5'. The resulting excessive copies of data, e.g., once D1D2D3D4 is stored at ZSC 540 in state 504, D3 at ZSC 510 is no longer needed to provide protection to D3 at ZSC 530, once D5' is convolved with D1-4, D5' is no longer needed, etc., and accordingly, the excessively redundant chunks can be correspondingly cleaned up.

Method 800, at 850, can comprise removing excessively redundant data. At this point method 800 can end. Excessively redundant data can result from the diversifying and/or the compacting of data storage at 820 and/or 830. As has been noted, moving data can comprise creating duplicates of data in other zones before deleting/freeing the original data, similarly, deletion of the original data can be delayed until it is determined that a data protection rule has been satisfied. As an example, D5' is created to protect D5 in system state 504, but D5' becomes excessively redundant where it will be convolved with D1-4. Therefore, upon determining that D1D2D3D4D5 properly protects D5, then D5' can be deleted, freed, etc.

Figure 9:
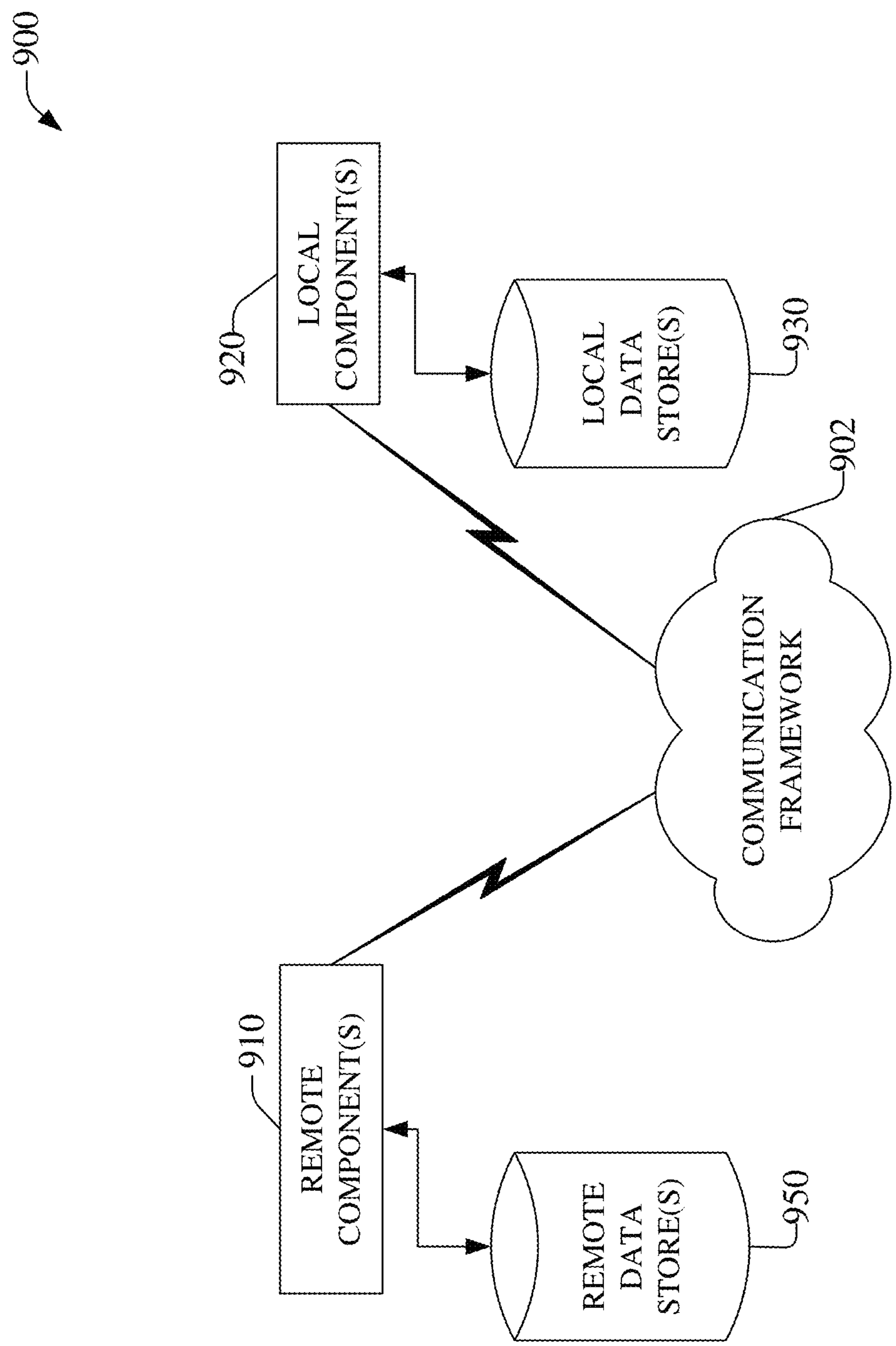
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework 102, 902, etc. ZSC 110-150, 210-250, 310-350, 410-460, 510-560, etc., can each be located remotely from other ZSCs, and thus can be regarded as remote component(s) 910 where located remotely from a local component, for example, another of the ZSCs from ZSC 110-150, 210-250, 310-350, 410-460, 510-560, etc. Moreover, scaling component 190, 290, 490, etc., can be located remotely from one or more of the ZSCs. Communication framework 902 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 902. In an aspect the remotely located ZSC or local ZSC can be embodied in ZSC 110-150, 210-250, 310-350, 410-460, 510-560, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 902 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 902. Similarly, local component(s) 920 can be operably connected to one or more local data store(s) 930, that can be employed to store information on the local component(s) 920 side of communication framework 902. As examples, information corresponding to chunks stored on ZSCs can be communicated via communication framework 902 to other ZSCs of a storage network, e.g., to facilitate compression, storage in partial or complete chunks, deletion of chunks, etc.

Figure 10:
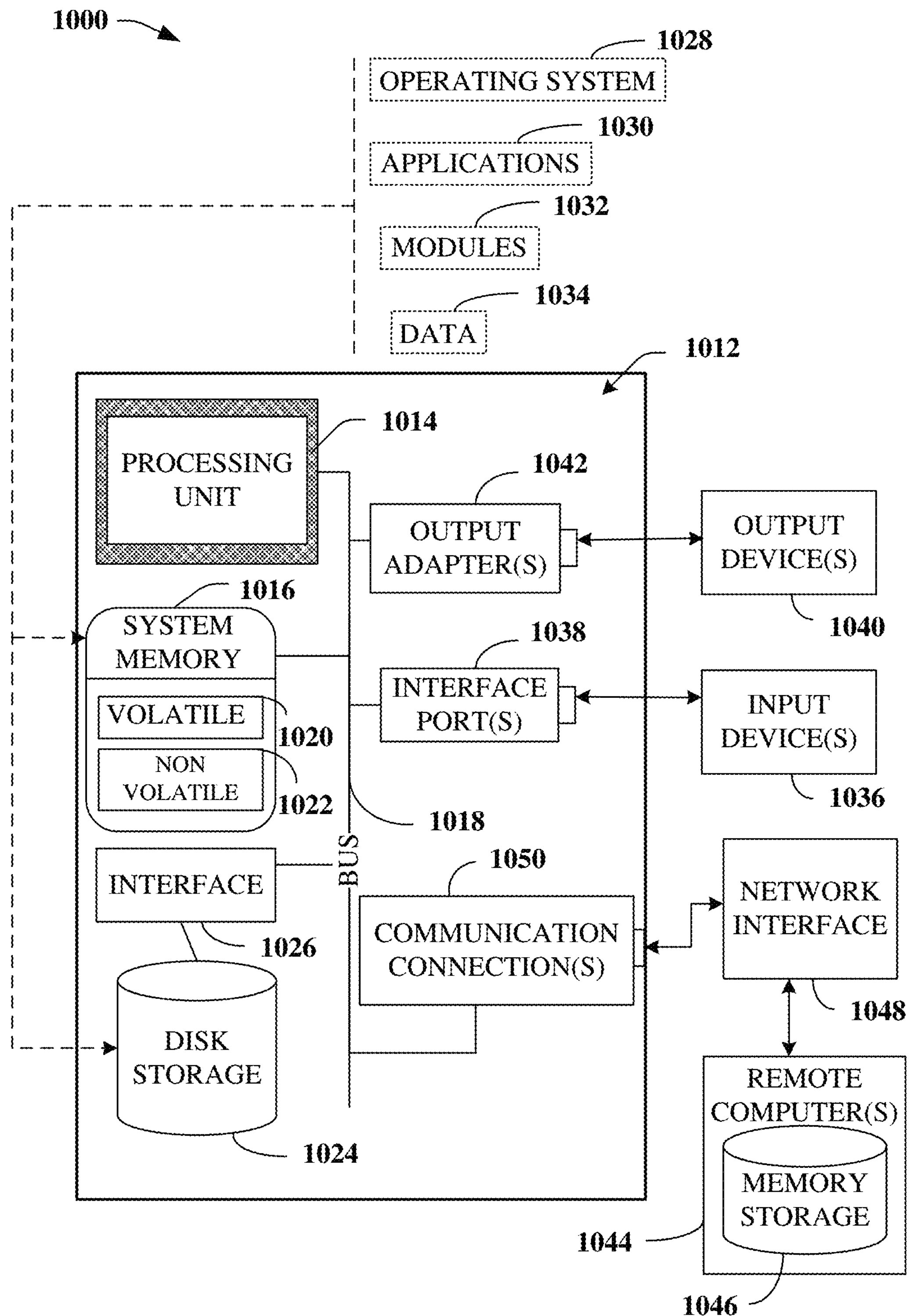
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC 110-150, 210-250, 310-350, 410-460, 510-560, etc., or in other components, such as scaling component 190, 490, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term “tangible” herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term “non-transitory” herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a machine-readable medium can comprise executable instructions stored thereon that, in response to execution, can cause a system comprising a processor to perform operations, comprising determining a topology of a geographically diverse storage system based on an expected bulk scale out event, wherein the expected bulk scale out event will increase the count of zone storage components of the geographically diverse storage system by at least two zone storage components, and in response to initiation of the expected bulk scale out event, causing movement of data stored by a first zone storage component to a second zone storage component, wherein the first zone storage component is comprised in the geographically diverse storage system prior to the expected bulk scale out event, wherein the second zone storage component is comprised in the geographically diverse storage system after the initiation of the expected bulk scale out event, wherein the movement of the data is in accord with the topology of the geographically diverse storage system resulting from the expected bulk scale out event, and wherein the replication is in accord with a geographically diverse storage system scheme of the geographically diverse storage system, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term “modulated data signal” or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (X) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:

a processor; and a memory that stores executable instructions that, when executed by the processor, facilitate performance of operations, comprising:

determining a resulting topology of a geographically diverse storage system based on a transition from a first state to a second state, wherein, in the first state, the geographically diverse storage system comprises a first count of zone storage components, wherein, in the second state, the geographically diverse storage system comprises a second count of the zone storage components, wherein the second count is at least two greater than the first count, and wherein the determining the resulting topology based on the transition from the first state to the second state occurs without causing data stored in a first zone storage component of the zone storage components of the first state to be moved to a second zone storage component of the zone storage components of the second state; and initiating moving a representation of information comprised in a first chunk stored in the first zone storage component to the second zone storage component, wherein the moving is in accord with the resulting topology and a geographically diverse storage system scheme of the geographically diverse storage system.

2. The system of claim 1, wherein the second zone storage component is newly added to the geographically diverse storage system.

3. The system of claim 1, wherein the second zone storage component is an existing zone storage component of the geographically diverse storage system.

4. The system of claim 1, wherein the initiating the moving is based on determining that a rule relating to storage diversity is satisfied.

5. The system of claim 1, wherein the initiating the moving is based on determining that a rule relating to data protection is satisfied.

6. The system of claim 1, wherein the initiating the moving is based on determining that a rule relating to computing resources is satisfied.

7. The system of claim 1, wherein the operations further comprise, in response to the moving, initiating compacting of a data protection chunk protecting at least the first chunk, wherein the compacting is based on the resulting topology and the geographically diverse storage system scheme of the geographically diverse storage system.

8. The system of claim 7, wherein the compacting comprises performing an 'exclusive-or' operation on the data protection chunk and another data protection chunk.

9. The system of claim 1, wherein the operations further comprise, writing a second chunk to a third zone storage component based on the resulting topology and the geographically diverse storage system scheme of the geographically diverse storage system.

10. The system of claim 9, wherein the operations further comprise, in response to the moving, initiating compacting of a data protection chunk protecting at least the first chunk, wherein the compacting further protects the second chunk, and wherein the compacting is based on the resulting topology and the geographically diverse storage system scheme of the geographically diverse storage system.

11. The system of claim 10, wherein the compacting comprises performing an 'exclusive-or' operation on the data protection chunk and a representation of the data stored in the second chunk.

12. A method, comprising:

in response to receiving information indicating that a geographically diverse storage system will undergo a bulk scale out event by adding at least two zone storage components, determining, by a system comprising a processor and a memory, a topology of the geographically diverse storage system that is to result from the bulk scale out event, wherein the determining the topology occurs prior to initiating movement of data stored by a first zone storage component of the geographically diverse storage system before the bulk scale out event to a second zone storage component of the geographically diverse storage system after initiation of the bulk scale out event; and causing, by the system, replication of a representation of information comprised in a first chunk stored in the first zone storage component to the second zone storage component, wherein the replication is according to the topology of the geographically diverse storage system resulting from the bulk scale out event, and wherein the replication is according to a geographically diverse storage system protocol of the geographically diverse storage system.

13. The method of claim 12, wherein the causing the replication of the representation of the information to the second zone storage component results in a copy of the representation of the information to be written to one of the at least two zone storage components added to the geographically diverse storage system.

14. The method of claim 12, wherein the causing the replication of the representation of the information to the second zone storage component results in a copy of the representation of the information to be written to a zone storage component that is not one of the at least two zone storage components added to the geographically diverse storage system.

15. The method of claim 12, further comprising, in response to the causing the replication of the representation of the information, initiating, by the system, convolving of a data protection chunk protecting at least the first chunk with another protection chunk protecting a third chunk, wherein the convolving is based on the resulting topology, and wherein the convolving is based on the geographically diverse storage system protocol of the geographically diverse storage system.

16. The method of claim 12, further comprising:

writing, by the system, a new chunk to a third zone storage component based on the topology and the geographically diverse storage system protocol of the geographically diverse storage system; and causing, by the system, the new chunk to be protected based on the resulting topology and the geographically diverse storage system protocol of the geographically diverse storage system.

17. A machine-readable storage medium, comprising executable instructions that, when executed by a processor, facilitate performance of operations, comprising:

determining a topology of a geographically diverse storage system based on an expected bulk scale out event, wherein the expected bulk scale out event is determined to increase the count of zone storage components of the geographically diverse storage system by at least two zone storage components; and in response to initiation of the expected bulk scale out event, causing movement of data stored by a first zone storage component to a second zone storage component, wherein the first zone storage component is comprised in the geographically diverse storage system prior to the expected bulk scale out event, wherein the second zone storage component is comprised in the geographically diverse storage system after the initiation of the expected bulk scale out event, wherein the movement of the data is in accord with the topology of the geographically diverse storage system resulting from the expected bulk scale out event, and wherein the replication is in accord with a geographically diverse storage system process of the geographically diverse storage system.

18. The machine-readable storage medium of claim 17, wherein the operations further comprise writing new data to a third zone storage component based on the topology and the geographically diverse storage system process of the geographically diverse storage system.

19. The machine-readable storage medium of claim 17, wherein the operations further comprise compacting a data protection chunk protecting at least the first chunk, wherein the compacting is based on the resulting topology, and wherein the compacting is based on the geographically diverse storage system process of the geographically diverse storage system.

20. The machine-readable storage medium of claim 19, wherein the compacting further protects new data written to a third zone storage component.

* * * * *